United States Patent [19]

Cox

[11] 4,381,236

[45] Apr. 26, 1983

[54] HIGH PRESSURE ROTARY CENTRIFUGAL SEPARATOR HAVING APPARATUS FOR AUTOMATICALLY CYCLICALLY RECIPROCATING A COROTATING SEPARATOR BASKET SCRAPER

[75] Inventor: Bradley G. Cox, Saginaw, Mich.

[73] Assignee: Baker Perkins Inc., Saginaw, Mich.

[21] Appl. No.: 236,033

[22] Filed: Feb. 19, 1981

[51] Int. Cl.[3] ...................... B01D 33/02; B01D 45/14

[52] U.S. Cl. .................................... 210/112; 91/225; 91/422; 210/374; 210/376; 210/380.3

[58] Field of Search ............ 91/49, 50, 222, 224–227, 91/422; 210/112, 360.1, 374, 376, 380.3

[56] References Cited

U.S. PATENT DOCUMENTS

| | | | |
|---|---|---|---|
| 384,186 | 6/1888 | Barth | 91/225 X |
| 1,028,124 | 6/1912 | Meissner | 91/301 X |
| 2,751,889 | 6/1956 | Mohler | 91/225 |
| 2,899,065 | 8/1959 | Irving | 210/376 |
| 2,921,559 | 1/1960 | Herrmann | 91/226 |
| 3,016,710 | 1/1962 | Kurz et al. | 91/49 X |
| 3,171,809 | 3/1965 | Cox | 210/376 |
| 3,338,418 | 8/1967 | Koslowski et al. | 210/376 X |
| 3,613,892 | 10/1971 | Ziller | 210/374 |
| 3,972,514 | 8/1976 | Voitsekhovsky et al. | 210/376 X |
| 4,037,520 | 7/1977 | Jakob | 91/225 X |
| 4,073,731 | 2/1978 | Fanta | 210/376 |
| 4,173,303 | 11/1979 | Cyphelly | 91/422 X |
| 4,193,874 | 3/1980 | Gerteis | 210/380.3 X |

*Primary Examiner*—Robert H. Spitzer

*Attorney, Agent, or Firm*—Learman & McCulloch

[57] ABSTRACT

A fluid pressure actuated system for axially reciprocating an element while the element is being driven in rotation. A piston is mounted within a piston chamber in a rotary shaft. The rod side of the piston head is continuously exposed to fluid under pressure supplied by a pump. A pilot valve is mounted in a chamber within the piston and is axially movable relative to the piston between opposite end limits. The valve cooperates with a ported sleeve which defines the valve chamber to apply pressure from the pump to the valve in a manner which shifts the valve from one of its end limits to the other each time the piston arrives at an end of its stroke. Shifting of the valve in turn controls the supply of fluid under pressure to the piston to cause reversal of the piston stroke. Both piston and valve are biased in one direction by fluid pressure at all times, movement of the piston and valve against the biasing pressure being accomplished by applying an overcoming fluid pressure in the opposite direction. The length of the piston stroke can be readily adjusted by making a selected one of a series of vent ports operative.

17 Claims, 7 Drawing Figures

HIGH PRESSURE ROTARY CENTRIFUGAL SEPARATOR HAVING APPARATUS FOR AUTOMATICALLY CYCLICALLY RECIPROCATING A COROTATING SEPARATOR BASKET SCRAPER

BACKGROUND OF THE INVENTION

Many centrifugal separators for separating liquids from solids (for instance, mother liquor from salt or other granules) require the interior of the separator basket to be scraped during the separating operation to remove the caked build-up of separated material from the basket interior on a controlled basis. Devices for accomplishing this purpose with machines of the contemporary capacity are well known in the art, one particular example of such an apparatus being that disclosed and claimed in U.S. Pat. No. 3,171,809. Other apparatus for accomplishing hydraulic reciprocation is shown in U.S. patents:

U.S. Pat. No. 384,186
U.S. Pat. No. 1,028,124
U.S. Pat. No. 2,751,889
U.S. Pat. No. 2,921,559
U.S. Pat. No. 3,016,710
U.S. Pat. No. 4,037,520
U.S. Pat. No. 4,173,303

In the apparatus shown in U.S. Pat. No. 3,171,809, an annular plate-like pusher member is mounted in the basket interior upon the end of a piston rod which is driven by a fluid pressure actuated system to reciprocate cyclically while the basket is revolving to drive the pusher member in axially of the separator basket, thus scraping material collected on the basket peripheral wall clear of the open end of the basket during a forward stroke. The piston rod is coaxially mounted within the rotary drive shaft which drives the separator basket in rotation and is coupled to rotate with the shaft so that the pusher and basket do not rotate relative to each other.

The prior art arrangement involves a more complex hydraulic system not suited to the higher pressures, i.e. up to 30,000 p.s.i. or more, dependent on pump pressures available, to be employed in the new, much larger capacity separator contemplated by the present invention, and the present invention is specifically claimed as an improvement over the reciprocatory system disclosed in U.S. Pat. No. 3,171,809 which it is estimated will increase pump efficiency in the neightborhood of sixty-six percent and result in significantly decreased manufacturing and maintenance costs.

One of the prime objects of the invention is to provide a piston assembly of the character described which eliminates formerly required seals and piston rings which were necessarily utilized to prevent pressure loss from one side of the piston to the other. The present system maintains a constant pressure on both sides of the piston, so that close fits and fine bore finishes for pressure sealing are completely unnecessary, and the device can be much more economically and rapidly constructed and assembled.

Another object of the invention is to provide a more compact and mechanically simple construction which has fewer operating parts and avoids the necessity of providing a control sleeve and actuator rod assembly for mechanically accomplishing what is hydraulically accomplished in the present invention.

Another important object of the invention is to provide a system which is one particularly adapted to providing a heavy thrust on a working stroke and compensating on the return stroke when the resistance to movement of the valve and piston assembly is far less. In the present system, a full, uninterrupted hydraulic fluid supply, constant in pressure and volume, is always in communication with the valve and piston assembly.

Another object of the invention is to provide in such a system a very simple means of adjusting the length of stroke.

Still another object of the invention is to provide a system which will operate in any position of orientation and in which the single control element is entirely enclosed within the primary piston, co-axially within the shafting assembly.

Still a further object of the invention is to provide an assembly in which the differential operating face areas of both primary and pilot pistons permit a single fluid pressure inlet with no interruption of flow in a system in which the pilot valve provides an axial bore for exhaust flow from the piston chamber only on the return stroke of the piston. Since there is an exhaust of fluid only on the return stroke, a pump of lesser capacity will accomplish much more in the system.

Still another object of the invention is to provide an easily assembled device in which a sleeve for the pilot piston can be provided within the main piston and held in place by an end retainer which also functions as a pilot stop face and pilot valve cushioning device, as well as having aperatures for exhaust and pressure communicating with the principal thrust area of the primary piston.

Another object of the invention is to provide an assembly in which the rate of primary piston travel can be easily controlled without in any way interfering with the rate of travel of the primary piston on the working portion of its stroke.

SUMMARY OF THE INVENTION

In accordance with the present invention, a piston is mounted for reciprocatory movement coaxially of a rotating shaft within a chamber formed in the interior of the shaft. The chamber is closed at its head end, while the rod end of the piston chamber is in constant communication with a source of fluid under pressure, so that the piston is constantly biased by the pressure applied at its rod end side toward a first end limit of movement relative to the shaft. A pilot valve is mounted within the piston for axial reciprocation relative to the piston between first and second end limits. Like the piston, the pilot valve has an annular chamber around its outer periphery which is in constant communication with the fluid pressure source, the opposite ends of this chamber being defined by two lands, one of which has an area greater than the other so that the constant pressure which exists in the annular chamber continuously biases the pilot valve toward what will be called its second end limit of movement relative to the piston.

A second annular chamber at the exterior of the pilot valve is bounded at one end by one of the lands on the valve and by an annular surface of the piston at its opposite end. This second annular chamber is in constant communication with a port through the piston wall which is aligned with a chamber communicating with the fluid pressure source when the piston is at its first end limit of movement and is aligned with a vent port when the piston is at its opposite end limit of movement relative to the shaft. This annular chamber port through the piston wall is sealed by a shaft surface while the piston is moving between its end limits, thus this last annular chamber is pressurized while the piston moves from its first end limit to its second or extended end limit, and the chamber is vented during movement of the piston in the opposite direction. When this annular chamber is pressurized, it overcomes the biasing force exerted in the first annular chamber described above and moves the valve to its first end limit of movement, at which time the valve connects the head end side of the piston to the source of fluid under pressure. This overcomes the normal biasing action exerted on the piston described above to drive the piston in its extending stroke. When the piston reaches its fully extended position, the second annular chamber of the valve is vented, the valve shifts, and this shifting of the valve vents the head end of the piston to return the piston to its original retracted position. Upon arrival of the piston at retracted position, the second valve chamber is connected to the pressure source to shift the valve back to its original position to repeat the cycle.

Other objects and features of the invention will become apparent by reference to the following specification and to the drawings.

IN THE DRAWINGS

Figure 1:
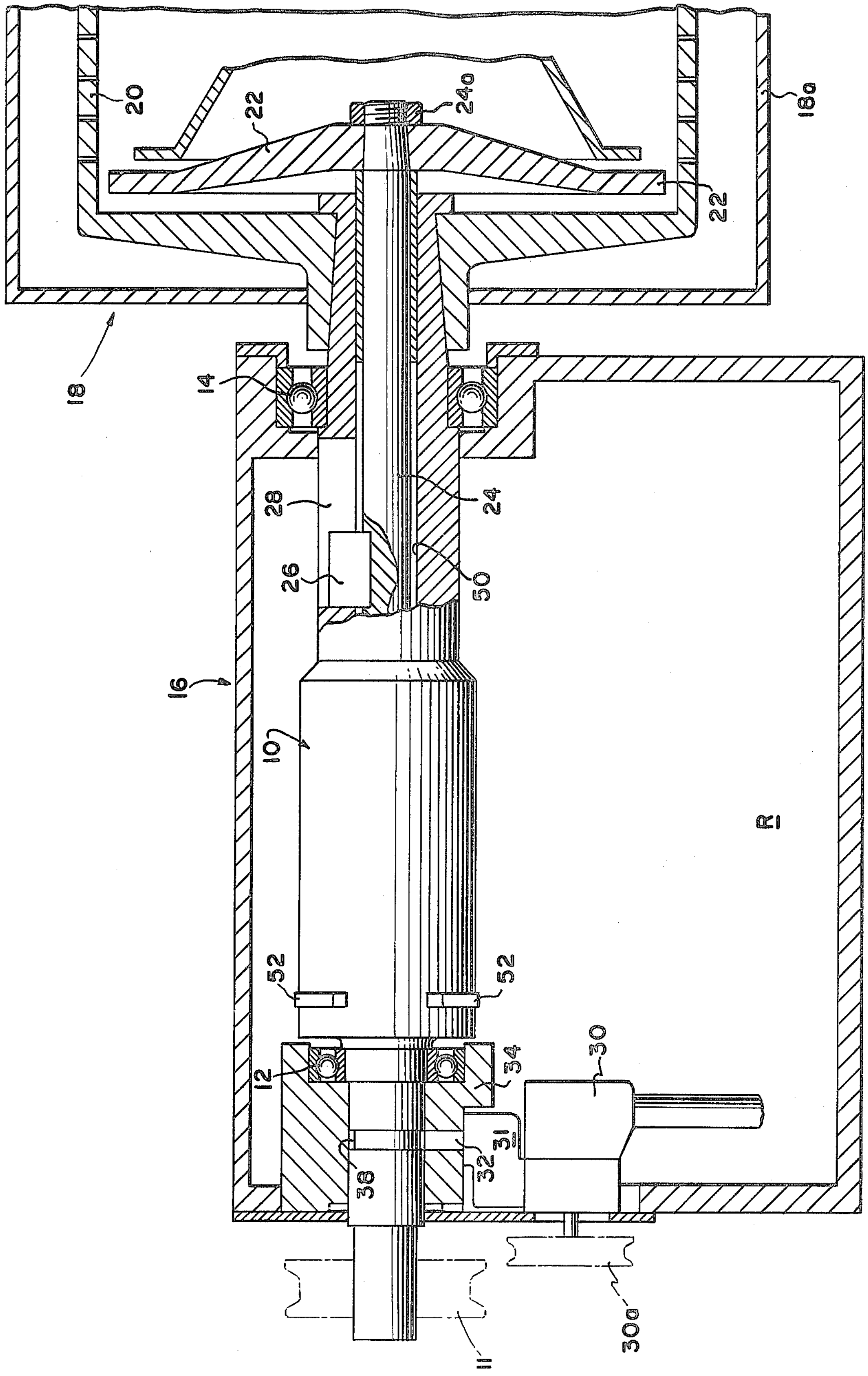
FIG. 1 is a cross-sectional view of a portion of a centrifugal separator assembly embodying the present invention.

Referring first to FIG. 1, a typical environment in which the present invention is used is generally indicated. A rotary shaft designated generally 10 is mounted for rotation, as by bearings 12 and 14 in a fixed housing or frame designated generally 16. Shaft 10 is driven in rotation by conventional means such as a sheave 11 driven by a suitable motor system, and carries at its right-hand end a centrifugal separator assembly designated generally 18 which includes a separator basket 20 fixedly mounted upon shaft 10 for rotation with the shaft within a liquid collecting chamber 18*a*. Like the separator shown in U.S. Pat. No. 3,171,809, an annular plate-like pusher member 22 is located within the interior of the basket 20 and is fixedly secured to the distal end of a piston rod 24, as with nut 24*a*. A key 26 is mounted upon piston rod 24 and is slidably received within an elongated slot 28 in shaft 10 to rotatively lock piston rod 24 to the rotary shaft 10 while accommodating axial reciprocation of rod 24 relative to shaft 10 so that pusher plate 22 may be driven to the right from the position shown in FIG. 1 to scrape off solid material which has collected upon the inner side wall of basket 20 to prevent undesired build-up of this material on the basket wall.

Figure 2:
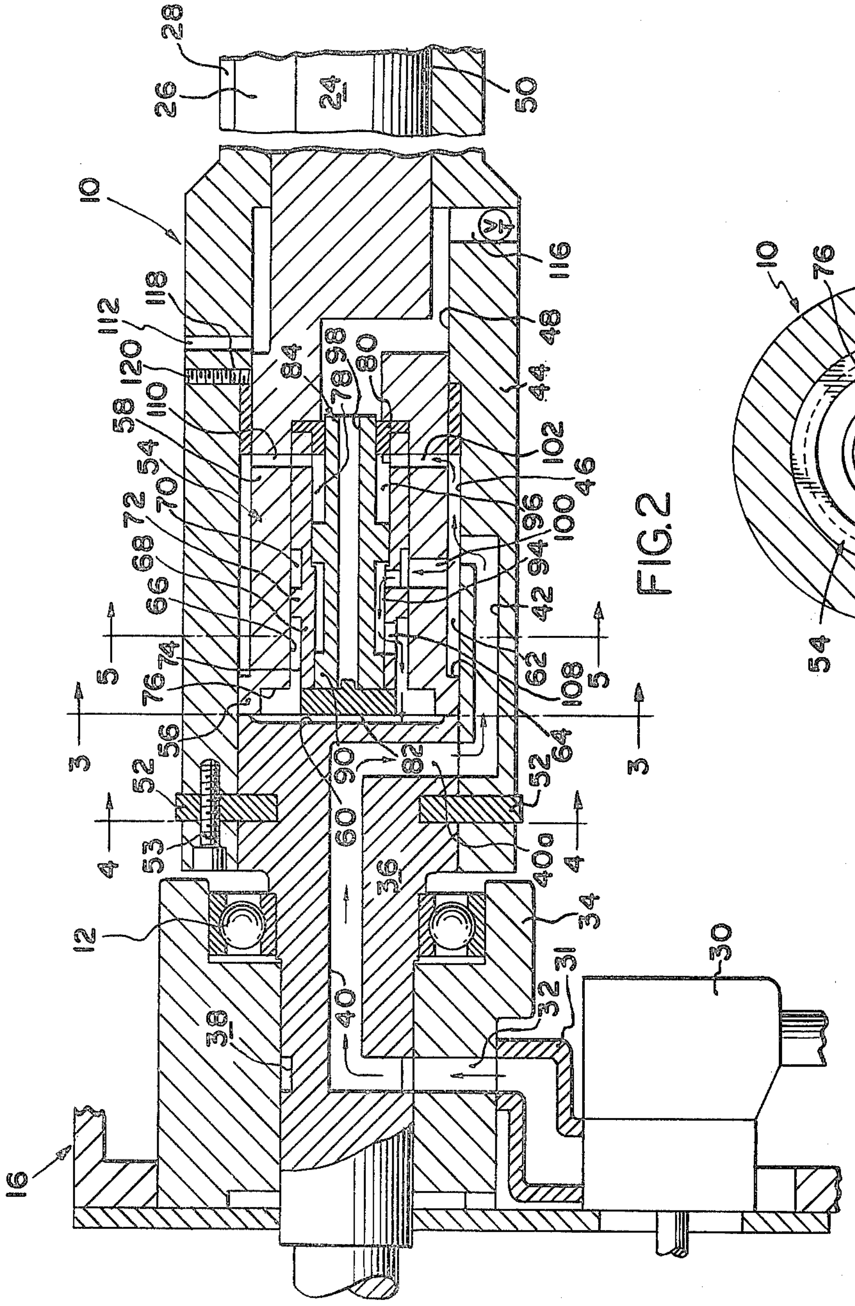
FIG. 2 is a detailed cross-sectional view through the shaft of FIG. 1, showing the piston control system of the present invention.

The present invention is especially directed to a fluid pressure operated system which will cyclically reciprocate piston rod 24 while the rod is rotating with the rotary shaft 10. Referring now particularly to FIG. 2, details of the system for reciprocating piston rod 24, which appears at the right-hand side of FIG. 2, are disclosed.

Figure 4:
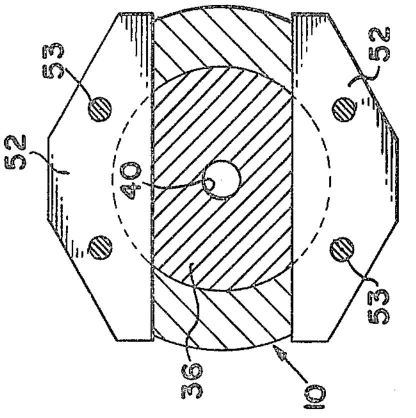
FIG. 4 is a detailed cross-sectional view taken on the line 4—4 of FIG. 2.
Figure 5:
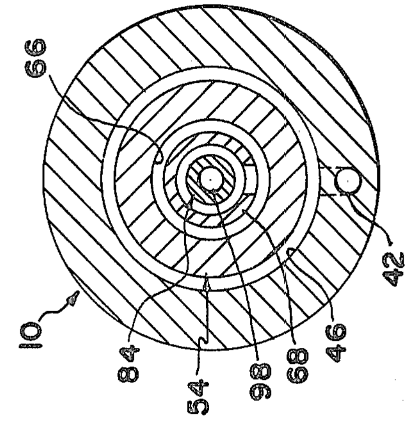
FIG. 5 is a detailed cross-sectional view taken on the line 5—5 of FIG. 2.

The reciprocatory system is powered by a pump 30 (via a sheave 30*a* connected with the motor system) mounted within housing 16, the housing serving as a reservoir R for supplying incompressible operating fluid to the pump. The pump output supplies fluid under pressure through a coupling 31 to a supply passage 32 in a stationary block 34 which is fixedly mounted on the wall of housing 16, and within which a stub shaft section 36 of shaft 10 is rotatively journaled. Stub shaft 36 is formed with an annular groove 38 aligned with radial passage 32, and an axially extending inlet passage 40 communicates with groove 38. Inlet passage 40 in turn communicates via passage portion 40*a* with an inlet passage 42 in the main shaft portion 44 of shaft 10, inlet passage 42 in turn opening into an internal piston chamber 46 formed in the interior of main shaft section 44. As seen in FIG. 2, piston chamber 46 is one section of a central passage which extends axially entirely through main shaft section 44, chamber 46 opening at its right-hand end as viewed in FIG. 2 into a reduced diameter portion 48 which in turn opens at its right-hand end into a still further reduced diameter rod-accommodating portion 50. The left-hand end of piston chamber 46 is closed by the insertion of stub shaft 36 into this end of chamber 46, with a fluid-tight fit, the stub section 36 and main section 44 of shaft 10 being axially and rotatively locked to each other by a pair of keys 52 (see also FIG. 4) secured by bolts 53.

A piston designated generally 54 is mounted within the passage defined by chambers 46, 48 and 50, piston 54 including the (left hand end) head section 56 which slidably and sealingly engages the wall of piston chamber 46, a reduced diameter guide section 58 similarly slidingly and sealingly engaged with the wall of chamber 48, and piston rod 24 slidably received within section 50. As shown in FIG. 2, piston 54 is at what will be referred to as its first end limit of movement—that is, its limit of movement to the left as viewed in FIG. 2 in which piston head 56 engages the right-hand end of stub shaft 36, this end of the stub shaft being relieved as at 60 so that fluid under pressure can be introduced to the head end of piston chamber 46 by various passageways to be described below.

It will be observed from FIG. 2 that the axial extent of the piston head section 56 is not very great and that a substantial extent of portion 58 is thus located within piston chamber 46 to define the "rod end" portion 62 of chamber 46. This annular rod and chamber portion 62 is in constant fluid communication with inlet passage 42 and so the operating pressure developed by pump 30 is always exerted against the small area back side 64 of the head section 56 of the piston. Thus, as will be developed more fully below, the fluid pressure developed by pump 30 always exerts a biasing action on piston 54 biasing the piston toward its left-hand end of movement (shown in FIG. 2). As will be developed below, the area of the back side of piston head section 56 is quite small as compared to the total area of the left-hand side of the piston head, thus this differential in area is substantial and when pressure from pump 30 is applied to both sides of the head, the biasing force exerted on the back side of the head 64 is easily overcome by the same pressure acting on the opposite side of head 56. A central bore portion 66 provided in piston 54 accommodates a sleeve 68 which is fixedly mounted within bore 66 in any suitable manner.

Figure 3:
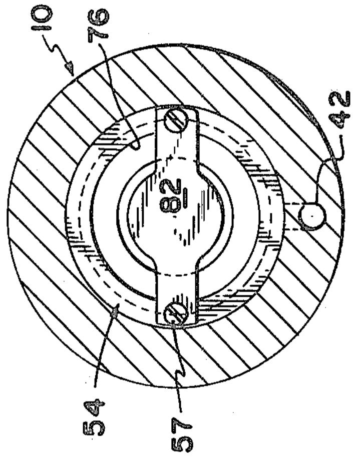
FIG. 3 is a detailed cross-sectional view showing details of the sleeve and pilot valve.

As viewed in FIG. 2, the right-hand end of sleeve 68 fits snugly within bore 66. An annular groove 70 defines a first annular chamber around the periphery of the sleeve which is separated by a land 72 from a reduced diameter portion at the left-hand end of the sleeve which opens into a recess 76 in the head end of piston 54. A central bore designated generally 78 extends entirely through sleeve 68, and a bore diameter reducing bushing 80 is seated in the right-hand of this central passage 78, while the left-hand end of passage 78 is blocked and sealed by a spider 82 fixedly carried by piston head 56 to which it is fixed by screws 57 (FIG. 3).

As is apparent from the foregoing description, sleeve 68 is fixedly held in position within piston 54 by spider 82 and, for all practical purposes, may be considered to be an integral part of the piston. By forming sleeve 68 separately from the formation of the piston, the provision of various passages and chambers is greatly facilitated.

A pilot valve designated generally 84 is slidably mounted within the central passage 78 through sleeve 68. Because several details of pilot valve 84 are of importance to the present invention, an enlarged view showing the valve, sleeve and adjacent portions of the piston is shown in FIG. 7 to which reference will be made in describing the valve 84.

Figure 7:
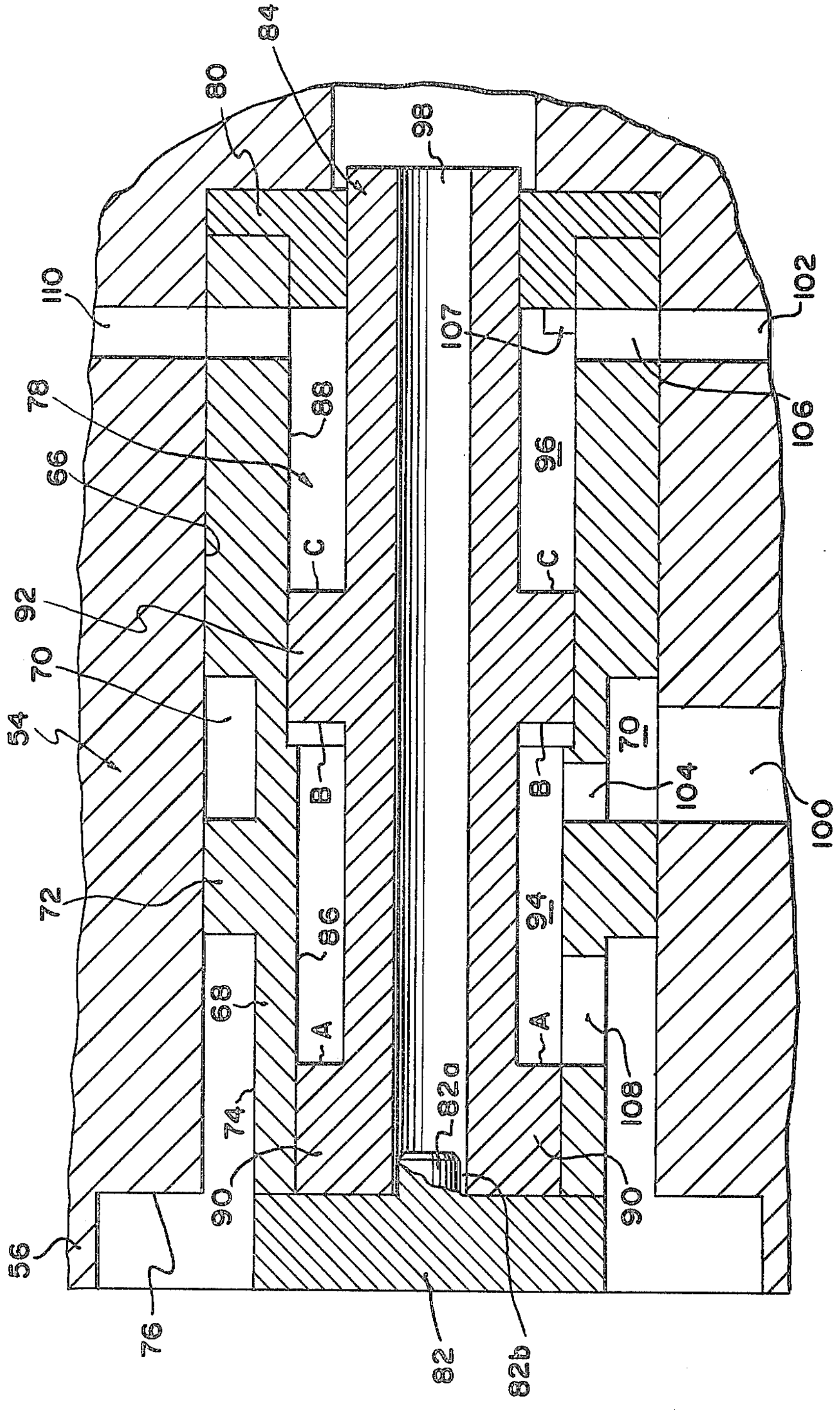
FIG. 7 is an enlarged fragmentary view more particularly illustrating the pilot valve assembly.

Referring now to FIG. 7, it is seen that the central passage 78 through sleeve 68 is not of constant diameter, but instead includes a reduced diameter section 86 at its left-hand end and a slightly enlarged diameter section 88 at its right-hand end, bushing 80 fitting into the right-hand end of the enlarged diameter section 88 of the central passage.

Valve member 84 is formed with a land 90 at its left-hand end, land 90 being slidably and sealingly received within the reduced diameter section 86 of the passage through sleeve 68. A second land 92 is formed intermediate the ends of pilot valve 84 and is slidably and sealingly received within the larger diameter section 88 of the sleeve passage. That portion of pilot valve 84 to the right of land 92 as viewed in FIG. 7 is slidably and sealingly received by bushing 80.

A first annular left end valve chamber 94 is thus defined between the exterior of pilot valve 84 in the wall of the central sleeve passage 78, while a second annular right end valve chamber 96 is similarly defined between the valve and sleeve between land 92 and the stationary bushing 80, this latter chamber 96 being of variable volume in that pilot valve 84 can axially reciprocate within passage 78 and move land 92 toward and away from the stationary bushing 80. Pilot valve 84 has a central passage 98 extending entirely axially through the valve. In FIG. 7 (and in FIG. 2) pilot valve 84 is shown at its extreme left-hand end limit of movement relative to sleeve 68, this limit of movement being established by the engagement of land 90 with spider 82 of piston 54.

Piston 54 is formed with passages 100 and 102 which communicate with the central bore 66 in piston 54. Referring briefly to FIG. 2, it is seen that both passages 100 and 102 are in constant communication with rod end chamber 62 which is in turn in constant communication with inlet passage 42. Thus, at all times, fluid under pressure is supplied to both of passages 100 and 102.

Returning now to FIG. 7, it is seen that passage 100 communicates with the annular groove 70 in sleeve 68 and a passage 104 through the wall of sleeve 68 in turn places groove 70 in communication with the first annular chamber 94 between pilot valve 84 and sleeve 68. At the same time, passage 102 in piston 54 is aligned with a passage 106 through sleeve 68 which places passage 102 in communication with the second annular chamber 96 between the valve and sleeve 68. Referring now particularly to land 90, it is seen that land 90 has an area A exposed to the fluid in chamber 94, while land 92 has a somewhat larger area B similarly exposed to fluid within chamber 94. Because the area B on land 92 is larger than the area A on land 90, the fluid under pressure in chamber 94 will exert a net force on pilot valve 84 tending to move valve 84 to the right from the position shown in FIG. 7. However, at this time (FIG. 7), such rightward movement is prevented due to the fact that the supply pressure also exists in the second chamber 96 and thus exerts a force against area C urging pilot valve 84 to the left, or to the position shown in FIG. 7. When supply pressure exists in both chambers 94 and 96, the valve 84 will be maintained at its left-hand end limit of movement shown in FIG. 7 (and FIG. 2) because the area B minus the area A is less than C. If, however, chamber 96 is vented (by means to be described hereinafter), valve 84 will move to the right from the position shown in FIG. 7 because area B is greater than area A and there no longer is any pressure exerted on area C. In this event, valve 84 will move to the right from the position shown in FIG. 7, until the right-hand side of land 92 engages a stop abutment 107 on bushing 80. The purpose of abutment 107 is to maintain a space between land 92 and bushing 80 so that fluid under pressure can subsequently be introduced between these two opposed surfaces to drive valve 84 back to the position shown in FIG. 7.

Provided on spider 82 is a return stroke cushioning projection 82*a* which, when pilot 84 is returning and land 90 closes passage 108 restricts the venting of hydraulic fluid (oil) in proceeding out port 98. It does this by providing a restricted space 82*b* between its outer periphery and the bore wall 98.

THE OPERATION

With various parts of the apparatus in the positions shown in FIG. 2, supply pressure from pump 30 is established via passages 32, 42, rod end chamber 62, and passages 100 and 104. A second port 108 connects chamber 94 at this time to chamber 74 and hence conducts fluid under pressure to the left-hand side of piston head 56 as viewed in FIG. 2. While this same pressure is at this time exerted on the back side 64 of piston head 56, the total exposed area of the left-hand side of piston head 56 vastly exceeds the area of its back side 64, hence piston 54 will commence to move to the right from the position shown in FIG. 2, carrying with it fixed sleeve 68 and shiftable pilot valve 84. There is, of course, no pressure in the space around rod 24 which communicates with exhaust 116.

During the initial movement of piston 54 to the right, from the position shown in FIG. 2, passage 102 in the piston moves into the reduced diameter guide section 48 of the shaft passage, thus disconnecting passage 102 from rod end chamber 62 and trapping fluid under supply pressure within passages 102, 106 and the annular valve chamber 96. The pressure thus trapped in chamber 96 maintains pilot valve 84 at its extreme left-hand limit of movement within sleeve 68 so that during movement of piston 54 to the right from the FIG. 2 position, pilot valve 84 remains at its extreme left-hand end limit of movement. Thus, fluid communication is maintained by pilot valve 84 via its chamber 94 between supply pressure at inlet passage 42 and the head or left-hand end of the piston so that the piston continues to drive to the right as viewed in FIG. 2.

Movement of piston 54 to the right from the FIG. 2 position will continue until a passage 110 in piston 54 (upper side of piston 54 above passage 102) places chamber 96 in communication with a vent passage 112 leading to the pump reservoir through the wall of shaft 10. When passage 110 in the piston moves into alignment with vent passage 112, the pressure trapped within valve chamber 96 is vented and valve 84 is thus free to move to the right under the action of the force differential exerted by the pressure in valve chamber 94 on land 92. This action shifts valve 84 to its right-hand end limit of movement, placing the piston and valve in the positions shown in FIG. 6.

Figure 6:
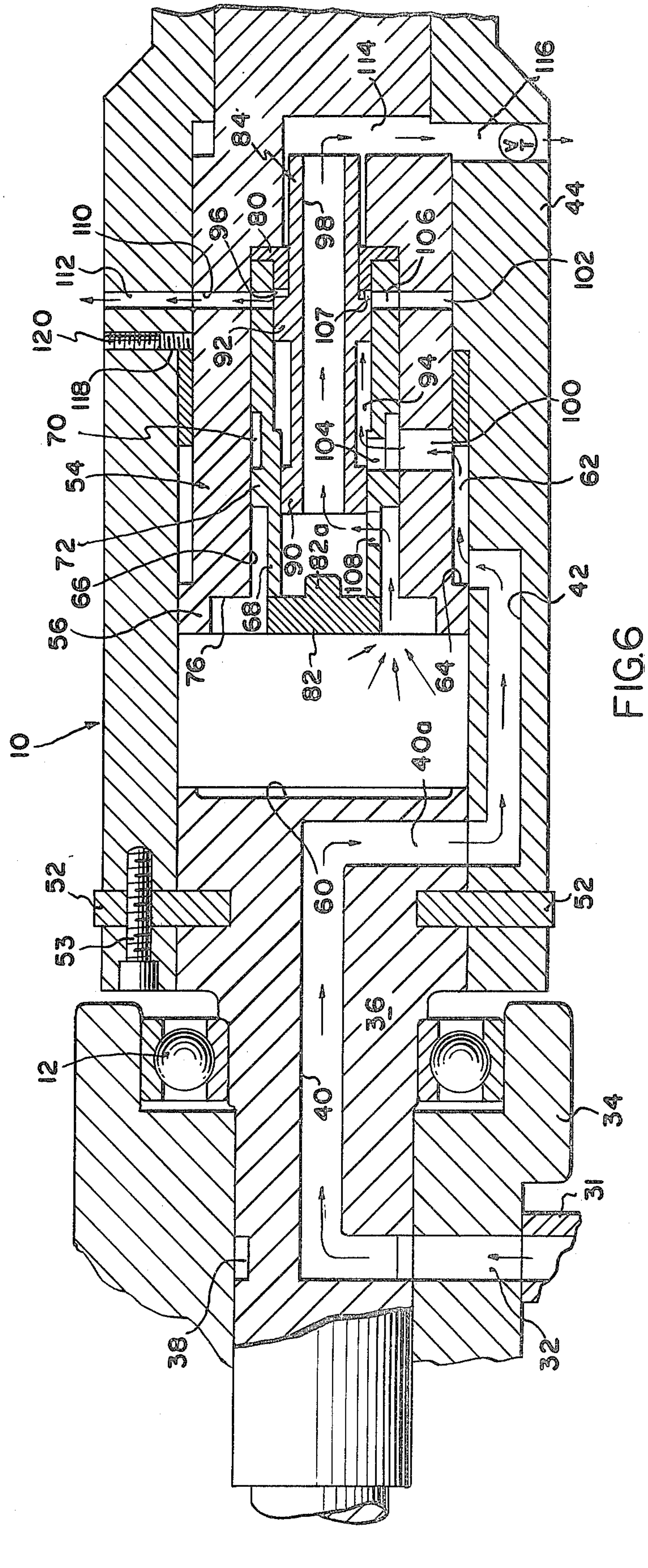
FIG. 6 is a detailed cross-sectional view, similar to FIG. 2 but on an enlarged scale, showing the piston in its fully extended position.

Referring now to FIG. 6, piston 54 is shown at its right-hand or extended limit of movement which, it should be noted, is not established by a mechanical stop, but is instead established by the alignment of piston vent passage 110 with shaft vent passage 112. As previously described, the alignment of passages 110 and 112 vents valve chamber 96 to allow the valve 84 to move to the position shown in FIG. 6.

This movement of the valve shifts land 90 on the valve to the right to uncover passage 108 which places the head end of the piston in venting communication with the central passage 94 through valve 84 which in turn opens into a vent passage 114 in piston 54 which in turn is in communication, throughout the entire range of movement of the piston, with a second vent passage 116 in shaft section 42 leading to the pump reservoir. This vents the fluid under pressure from the left-hand side of piston 56 as viewed in FIG. 6, and as the pressure at the left-hand side of piston head 56 is so vented, the pressure at the underside 64 of piston head 56 begins to drive the piston to the left from the position shown in FIG. 6 back toward the original position shown in FIG. 1. It should be recalled that the left-to-right movement of the piston 54 is the "power" stroke when the solids accumulated on perforate basket 20 are moved to the right and out the open right end of basket 20. The right-to-left return is accomplished with little resistance to the piston's motion. Provided in passage 116 to restrict the flow and control, the rate of return is an adjustable orifice throttle valve VT of conventional construction.

During this leftward movement of piston 54, pilot valve 84 remains at the right-hand end limit shown in FIG. 6, because no pressure exists in chamber 96, and the differential pressure exerted in chamber 94 holds valve 84 at its right-hand end limit of movement relative to the sleeve and piston. Valve 84 remains at its right-hand end limit of movement until piston 54 has substantially returned to the original FIG. 2 position, at which time the passage 102 in piston 54 is again exposed to chamber 62. When passage 102 again communicates with chamber 62, fluid, under supply pressure in chamber 62, passes through passage 102, sleeve passage 106 and into chamber 96 to drive piston 84 back to its extreme left-hand end limit of movement which is illustrated in FIG. 2.

The system is now in condition to repeat the cycle described above.

The length of the reciprocatory stroke of the piston may be easily adjusted by providing additional vent passages such as 118 at selected positions axially along the shaft. Passages 118 not in use can be plugged, as by a screw 120. The piston 54 will reverse stroke when passage 110 of the piston moves into alignment with the first unplugged passage such as 118 or 112. In other words, to shorten the stroke of the piston, the plug 120 could be removed from passage 118 and inserted in passage 112. With passage 118 unplugged, the piston would reverse its stroke as soon as passage 110 in the piston moved into alignment with passage 118.

While one embodiment of the invention has been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

I claim:

1. In a centrifugal separator assembly or the like wherein an element is mounted upon a rotary shaft means to be driven by said shaft means simultaneously in both rotation and axial reciprocation; the improvement wherein said rotary shaft means has a first chamber closed at one end and a bore extending coaxially from the other end of said first chamber, said first chamber having an internal diameter greater than that of said bore, a piston having a head section sealingly slidably received in said first chamber and a guide section sealingly slidably received in said bore, said piston being axially reciprocable within said shaft means between a first end limit wherein said head section is adjacent said one end of said first chamber and a second end limit wherein said head section is adjacent said other end of said first chamber, a source of hydraulic fluid under pressure, inlet passage means in said shaft means for conducting fluid under pressure from said source to said other end of said first chamber to bias said piston toward its first end limit, a pilot valve slidably mounted within a main valve chamber within said piston for reciprocatory movement within said piston between first and second end limits, first passage means in said piston and said valve operable when said valve is at its first end limit to conduct fluid under pressure from said other end of said first chamber through said head section to said one end of said first chamber to drive said piston to its second end limit, second passage means in said piston and said valve operable when said piston is at its first end limit to conduct fluid under pressure from said inlet passage means to a portion of said main valve chamber to bias said valve to its first end limit, third passage means in said piston and said shaft means for venting said portion of said main valve chamber upon arrival of said piston at its second end limit to allow said valve to move to its second end limit, and fourth passage means in said valve, said piston and said shaft means operable when said valve is at its second end limit for venting said one end of said first chamber to allow the bias of fluid under pressure in said other end of said first chamber to restore said piston to its first end limit; said main valve chamber being closed at one end, means defining a first axial section of said main valve chamber of a first diameter extending from said closed end of said main valve chamber and terminating at a first location intermediate the ends of said main valve chamber and, a second axial section of said main valve chamber of a diameter greater than that of said first section extending from said first location to the opposite end of said main valve chamber, means defining a coaxial guide bore extending from said opposite end of said main valve chamber, said guide bore having a diameter less than that of said second axial section, a valve body having a first annular land at one end thereof received in sliding sealed engagement with the wall of said first axial section, a second annular land on said valve body received in sliding sealed engagement with the wall of said second axial section, and an end section on said valve body received in sliding sealed engagement within said guide bore, said first and second lands defining a first annular valve chamber therebetween and said second land defining a second annular valve chamber with said opposite end of said main valve chamber, said first annular valve chamber constituting a portion of said first passage means and said second annular valve chamber constituting the terminus of said second passage means.

2. The invention defined in claim 1 wherein said second passage means comprises means defining a third port extending through said piston from said opposite end of said main valve chamber to a location on the guide section of said piston adjacent to said opposite end of said first chamber when said piston is at its first end limit whereby said second annular chamber is in communication with said inlet passage means when said piston is at its first end limit, said third port being closed by movement of said piston from its first end limit to trap fluid under pressure in said second annular valve chamber to hold said valve at its first end limit during movement of said piston from its first end limit to its second end limit.

3. The invention defined in claim 2 wherein the area of said second land exposed to pressure in said first annular valve chamber is greater than the area of said first land exposed to pressure in said first annular valve chamber and said first annular valve chamber is in communication with said inlet passage at all times whereby the fluid pressure in said first annular valve chamber constantly biases said valve toward its first end limit, the sum of said area of said first land and the area of said second land exposed to pressure in said second annular valve chamber being greater than said first mentioned area of said second land.

4. The invention defined in claim 3 wherein said third port constitutes a portion of said third passage means when said piston is at its second end limit, and the remainder of said third passage means is defined by a vent port in said shaft means aligned with said third port when said piston is at its second end limit.

5. The invention defined in claim 4 further comprising a plurality of said vent ports located at axially spaced positions on said shaft means along the path traversed by said third port of said piston, and plug means for plugging all but a selected one of said plurality of vent ports, the axial location of said selected one of said vent ports establishing the location of the second end limit of movement of said piston relative to said shaft means.

6. In a centrifugal separator having a fluid pressure reciprocated piston assembly including a housing having a piston chamber therein with a rod opening at one end, a piston including a piston head reciprocable within said piston chamber and hydraulically dividing said piston chamber into a head end and a rod end and a piston rod fixedly secured to said head and slidably projecting through said rod opening, a source of hydraulic fluid under a constant pressure, and control means for controlling the flow of fluid between said source, said piston chamber and a vent to drive said piston and rod in cyclic reciprocation relative to said housing; the improvement wherein said control means comprises inlet passage means constantly connecting said rod end of said piston chamber to said source to constantly bias said piston toward said head end of said piston chamber, means defining an axially extending valve chamber in said piston, said valve chamber having a first section of a first diameter at one end and a second section of a larger diameter at its other end, a valve member having first and second lands thereon respectively slidably received in said first and second sections of said valve chamber and defining a first annular chamber therebetween, said first land being located at one end of said valve member, a valve stem extending from said second land to the other end of said valve member and slidably received in a stem receiving opening at said other end of said valve chamber and defining a second annular chamber between said second land and said other end of said valve chamber, means defining an axial passage through said valve member, first port means in said piston establishing constant fluid communication between said rod end of said piston chamber and said first annular chamber, second port means in said piston operable when said piston is at said head end of said piston chamber to place said second annular chamber in communication with said rod end of said piston chamber to drive said valve member to said one end of said valve chamber, third port means in said piston operable when said valve member is at said one end of said valve chamber to place said head end of said piston chamber in communication with said rod end thereof via said first annular chamber to drive said piston away from the head end of said piston chamber, movement of said piston away from said head end closing said second port means to trap fluid under pressure in said second annular chamber, first vent passage means in said piston and said housing operable to vent fluid under pressure from said second annular chamber when said piston has moved a predetermined distance from said head end, to thereby permit said valve member to move away from said one end of said valve chamber, movement of said valve member away from said one end of said valve chamber insolating said third port means from said rod end of said piston chamber and establishing communication between said head end and said axial passage through said valve member, and second vent passage means in said piston and said housing in constant communication with said axial passage.

7. The invention defined in claim 6 wherein the areas of said first and said second lands which are exposed to said first annular chamber are A and B respectively, the area of said second land exposed to said second annular chamber is C, and the magnitudes of A, B and C are such that area B minus area A is less than C.

8. In a centrifugal separator assembly or the like wherein a basket scraper element is mounted upon a rotary shaft means to be rotatively driven by said shaft means and axially reciprocated relative to it, and means is provided for rotating said shaft means; the improvement wherein said rotary shaft means has a first piston chamber closed at one end and a bore extending from the other end of said first chamber, said first chamber having an internal diameter greater than that of said bore, a piston having a head section sealingly slidably received in said first chamber and a rod section sealingly slidably received in said bore, said piston being axially reciprocable within said shaft means between a first end limit wherein said head section is adjacent said closed end of said first chamber and a second end limit wherein said head section is adjacent said other end of said first chamber, said piston including axially spaced radial surfaces of differential area, a valve chamber, and a vent passage connecting with said valve chamber, a source of hydraulic fluid under pressure, inlet passage means in said shaft means for conducting fluid under pressure from said source to one of said surfaces to constantly bias said piston in one axial direction, a pilot valve slidably mounted within said valve chamber within said piston for reciprocatory movement within said piston between first and second end limits, said valve having axially spaced radial surfaces of differential area, first passage means in said piston and said valve operable when said valve is at its first end limit to conduct fluid under pressure through said head section to said closed end of said first chamber to drive said piston to its second end limit, second passage means in said piston and said valve operable when said piston is at its first end limit to conduct fluid under pressure from said inlet passage means to a portion of said main valve chamber adjacent one of said valve surfaces to bias said valve to its first end limit, a radial valve vent passage means in said shaft means communicatable with said vent passage in the piston when the piston has moved axially to radially aligned position with it for venting said portion of said main valve chamber substantially upon arrival of said piston at its second end limit to allow said valve to move to its second end limit, and a second vent passage in said shaft means operable when said valve is at its second end limit for venting one end of said first chamber to allow the bias of fluid under pressure to restore said piston.

9. The invention defined in claim 8 wherein said first passage means comprises means defining first and second ports in said piston respectively in communication with each of said differential area piston surfaces, said first and second ports opening into said valve chamber at axially spaced locations, the differential area radial valve surfaces including a pair of axially spaced lands on said valve defining with the wall of said valve chamber a first annulr chamber at the exterior of said valve, said first annular chamber bridging said first and second ports to place said ports in communication with each other when said valve is at its first end limit.

10. The invention defined in claim 9 further comprising means defining a central passage through said valve constituting a venting passage means communicating with said second vent passage in said shaft means, said valve when at its second end limit having one of said lands disposed axially between said first and second ports to block communication therebetween while placing said central passage in communication with said first port.

11. The invention defined in claim 10 in which the head end of the piston includes a detachable spider having a protrusion on its face which projects into said central passage to form a fluid restricting passage around it for cushioning return of the valve to first end limit position.

12. The invention defined in claim 8 in which an additional radial valve vent is provided in said shaft means axially spaced from said radial valve vent to serve as an optional vent with said vent passage in the piston, and removable means is mounted to prevent flow through it until a change in piston stroke length is desired.

13. The invention defined in claim 8 in which a throttle valve means is provided in association with said second vent passage to control return of said piston under reduced load without throttling movement of the piston in the opposite direction.

14. The invention defined in claim 8 in which a removable sleeve forming a part of said piston is provided in said piston chamber to house said valve.

15. In a centrifugal separator or the like wherein an element mounted upon a rotary shaft means is driven by said shaft means simultaneously both in rotation and axial reciprocation, said apparatus including means defining a piston chamber within said shaft means, piston means including a piston head slidably received within said piston chamber for reciprocatory movement between opposite end limits of movement within said piston chamber, said piston head dividing said piston chamber into a rod end chamber and a head end chamber, a source of fluid pressure, and valve means for conducting fluid pressure from said source to and from said piston chamber to drive said piston means in cyclically repeated reciprocation, said valve means including means defining a valve chamber within said piston means and a valve member slidably received within said valve chamber for reciprocatory movement between opposite end limits of movement;

the improvement comprising axially spaced first and second land means on said valve member defining a first chamber therebetween and second and third chambers at the sides of said respective land means remote from said first chamber, first passage means continuously connecting said source to said rod end of said chamber and to said first chamber to bias said piston head toward one of its end limits of movement within said piston chamber and continuously connecting said source to said first chamber to continuously bias said valve member toward one of its end limits of movement within said valve chamber, first port means for connecting said source to said third chamber when said head is at said one end limit of movement to overcome the bias exerted on said valve member via said first means to thereby drive said valve member to said other of its end limits of movement within said valve chamber, said valve member when located at said other of said end limits connecting said source to said head end of said piston chamber to drive said head to said other of its end limits of movement within said valve chamber, second port means for venting said third chamber upon the arrival of said head at said other of its end limits to thereby permit said valve member to be biased to its one end limit of movement within said valve chamber, and means in said valve member for venting the head end of said piston chamber when said valve member arrives at its one end limit to thereby permit said head to be biased back to its one end limit.

16. The invention defined in claim 15 wherein said valve member comprises a valve stem of a first diameter, one of said land means being of a second diameter greater than said first diameter, and the other of said land means being of a third diameter greater than said second diameter.

17. The invention defined in claim 15 wherein said second port means comprises a radial port extending from said third chamber through said piston means, a series of vent ports at axially spaced locations on said shaft means aligned with the path of movement of said radial port, and plug means closing all but a selected one of said vent ports, the alignment of said radial port with said selected one of said vent ports establishing said other of said end limits of movement of said piston means.

* * * * *